United States Patent Office 3,152,072
Patented Oct. 6, 1964

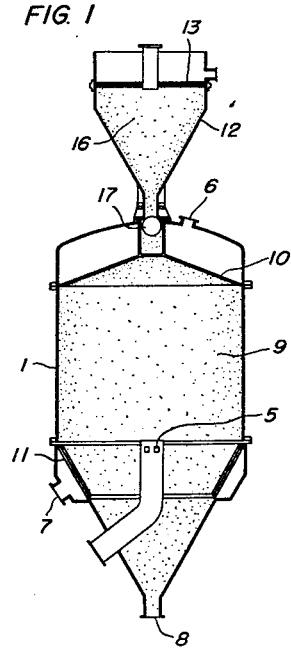
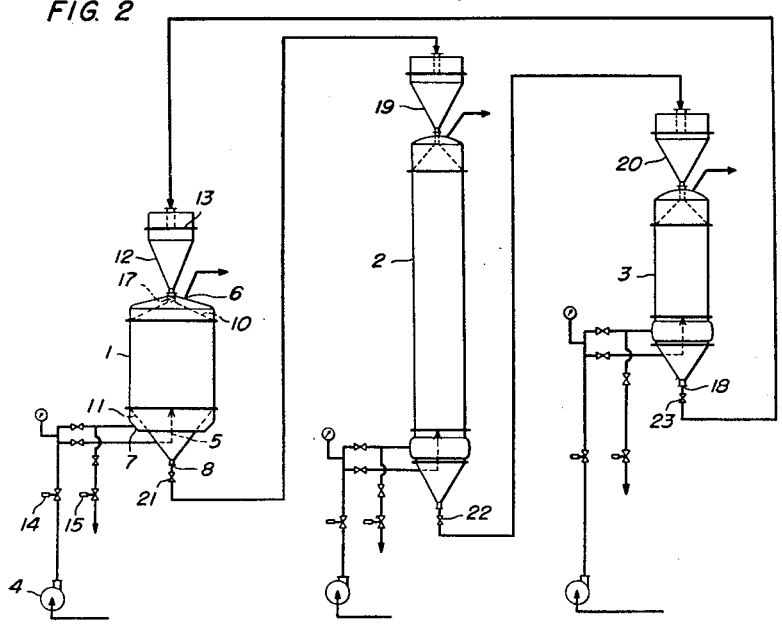

3,152,072
METHOD AND APPARATUS FOR CONTINUOUSLY TRANSFERRING ION EXCHANGE RESIN
Akira Yomiyama and Yuzo Nanke, Tokyo, and Noriaki Mizuma, Nobeoka-shi, Japan, assignors to Asahi Kasei Kogyo Kabushiki Kaisha, Osaka, Japan, a corporation of Japan
Filed June 6, 1961, Ser. No. 115,245
Claims priority, application Japan June 7, 1960, 35/26,656
4 Claims. (Cl. 210—33)

This invention relates to methods for continuously transferring ion exchange resins from one zone of a process to another, and particularly to methods applicable to a continuous ion exchange apparatus of the movable bed type.

Recently various attempts have been made to effect the continuous movement of an ion exchange resin in an ion exchange apparatus to attain economical advantages including a decrease in the amount of resin required, improvements in the efficiency of ion exchange as well as of regeneration, and reduction in labor and raw materials and the like, as compared with an ion exchange apparatus of the fixed bed type. These attempts, however, frequently make the mechanism or operations of an ion exchange apparatus too complicated and laborious. Furthermore, the modification of ion exchange apparatus for the transfer of an ion exchange resin is accompanied by related difficulties, e.g. leakage or dissipation of said resin.

In order to overcome the above-mentioned difficulties, we have found a method, as detailed hereinafter, by which the transfer of an ion exchange resin is smoothly and simply effected.

The present invention resides in an ion exchange apparatus of the movable bed type, which comprises an ion exchangeable liquid-passing vessel, a regenerating vessel and a water-washing vessel separately disposed but functionally combined, and in which an ion exchange resin is continuously discharged from each of these vessels by means of individual internal liquid pressures while the resin is supplied intermittently by means of magnet valves operated by cycle timer. The term "movable bed type" or the like as used hereinafter means that an ion exchange resin is present in the form of a bed in a vessel and that it can be transferred while it is maintained in the same form.

The present invention will next be detailed in connection with the attached drawing which includes FIG. 1 showing one embodiment of the present invention and FIG. 2 showing the flow diagram of the same.

With reference to FIG. 1 or FIG. 2, there are shown an ion-exchangeable liquid-passing vessel 1, a regenerating vessel 2 and a water-washing vessel 3. A raw liquid is introduced through an inlet port 5 by means of a liquid circulation pump 4 and then it is passed upwardly through the liquid-passing vessel 1. During the upward passage of the raw liquid, it is contacted with an ion exchange resin 9 maintained in bed form in the vessel 1, whereby an ion exchange reaction is effected. The thus treated liquid is discharged through a wire gauze 10 from an outlet port 6. The vessel 1 is kept at constant pressure by means of the raw liquid supplied by the pump 4. By this internal pressure, the resin having effected an ion exchange action, together with the liquid within the vessel 1, is automatically passed through a resin-exit port 8 disposed at the bottom of the vessel 1 to a hopper 19 disposed at the upper part of the regenerating vessel 2.

After the above-mentioned operations are carried out for several hours, a magnet valve 14 for passing liquid is closed by the action of a cycle timer (not shown), and at the same time a magnet valve 15 for discharging liquid is opened by the timer, whereby a part of the liquid within the vessel is automatically discharged from a liquid-discharging port 7 through the wire gauze 11 by means of the internal pressure and head. Thus, the liquid pressure within the vessel is lowered so that the transfer of the ion exchange resin to the regenerating vessel is stopped, while another ion exchange resin 16, which is held in reserve in the hopper 12 and which has been regenerated and water-washed, is introduced through a ball valve 17 into the liquid-passing vessel by means of the difference of heads. Upon the introduction of ion exchange resin 16 from the hopper 12 into the vessel 1, another portion of ion exchange resin in an amount equal to that of the introduced resin is metered from the resin-exit port 8 by the internal liquid pressure of the water-washing vessel. After a suitable period, the timer operates again to close the liquid-discharging magnet valve 15 and to open the liquid-passing magnet valve 14, whereby the pressure in the vessel 1 raises so that the ball valve 17 is closed to intercept the flow of the ion-exchange resin into the vessel. Thus the ion exchange resin held in the lower part of the vessel 1 is gradually metered again into the regenerating vessel.

A metal wire 13, which acts as a water tray through which only liquid is passable, is disposed at the upper part of the hopper 12, and ion exchange resin coming from the water-washing vessel into the hopper 12 of the liquid-passing vessel 1 is thereby limited such that the resin is accumulated up to the level of the wire gauze at the upper part of said hopper. Thus the internal pressure reaches a balance to automatically stop the flow of the resin thereinto. Such correlation is entirely the same as in the case whereby ion exchange resin is transferred from the liquid-passing vessel to the hopper 19 of the regenerating vessel or from the regenerating vessel to the hopper 20 of the water-washing vessel. The time for transferring the resin is smoothly controlled by adjusting hand cocks 21, 22 and 23 as required.

In the regenerating vessel 2 in which resin is regenerated by a regenerating liquid and in the water-washing vessel 3 in which regenerated resin is washed with water, the transfer of both liquid and ion exchange resin is carried out in the same manner as in the liquid-passing vessel. The dimension of each of the vessels should be suitably determined depending upon the specific conditions, e.g. regeneration efficiency, water-washing efficiency, exchange equilibrium, exchange velocity, etc. The transferable amount of resin can be easily controlled by adjusting the periodicity of the cycle timer.

In a method of the present invention, ion exchange resin is transferred simply by head or liquid pressure, without necessitating the use of complicated or special transfer means. Liquid-passing valves and liquid-discharging valves employed herein are operated by means of an ordinary cycle timer, and therefore there is no problem as regards the mechanisms or operations of the present invention.

The present invention will next be detailed in connection with a typical embodiment described hereinbelow.

This embodiment is directed to the removal of copper ion from a weakly acidic liquid (pH 2–6, containing 60 mg./l. $CuSO_4$ and 3000 mg./l. $(NH_4)SO_4$) which results from a manufacturing process for producing cupro-ammonium rayon yarn.

Into a liquid-passing vessel which is packed with 3 m.$^3$ of strongly acidic cation exchange resin, a raw acidic liquid is passed at a velocity of 100 m.$^3$ per hour, said resin having been previously made into an ammonium type. During the passage of the liquid which takes over thirty minutes, about 100 l. of resin stream containing about 70% of swollen resin are transferred from the bottom part of the vessel to the hopper of a regenerating vessel by means of internal pressure. Thirty minutes later, a cycle timer acts to close a liquid-passing magnet valve for fifteen seconds and to open a liquid-discharging magnet valve for the same period, during which 160 l. of a raw liquid are withdrawn and simultaneously about 100 l. of resin stream containing about 70% swollen resin is transferred from the hopper of the liquid-passing vessel through a ball valve into the present vessel in response to the decrease in the internal pressure within the vessel. After fifteen seconds, the cycle timer acts again whereby the liquid flow comes back to its initial state. The passage of the liquid for 30 minutes and stoppage of liquid for 15 seconds are repeated alternately. The transfer of ion exchange resin is repeated in the same manner.

The ion exchange resin is subjected to an ion exchange reaction with copper ions in the liquid-passing vessel thereby to convert the same into a copper type, and then it is withdrawn together with a part of the raw liquid through the bottom of the vessel and passed into the hopper of the regenerating vessel, in which the resin is moved in the same manner as in the liquid-passing vessel while it is regenerated with an aqueous 5% ammonium sulfate solution. The resin, which has been made into an ammonium type again, is metered from the bottom of the regenerating vessel to the hopper of the water-washing vessel. It is further transferred into the water-washing vessel, in which it is washed with soft water. The washed resin is metered from the bottom of the water-washing vessel to the hopper of the liquid-passing vessel for its cyclical reuse.

With respect to a liquid-passing vessel which serves to remove copper ions from a weakly acidic solution resulting from the cupro-ammonium rayon yarn-manufacturing process, one typical embodiment using four liquid passing vessels is as follows.

Solution to be treated:

It contains 1200 mg. of $H_2SO_4$/l. and 680 mg. of $CuSO_4$/l. Said solution is treated at the rate of 300 m.$^3$/hr. through the liquid passing vessel. Copper amount to be treated in the four liquid-passing vessels: 81 kg. Cu/hr.

ion exchange resin:

Adsorbed copper amount: 40 kg. Cu/m.$^3$ resin
Circulated resin amount:
    2.025 m.$^3$/hr.
    =0.506 m.$^3$/hr. in one vessel
    =169 l./per vessel in 20 minutes
Ion exchangeable zone: 0.34 m.
Transfer velocity of resin within each vessel: 0.27 m./hr
Thickness filled: 1.0 m.

Liquid-passing vessels:

Diameter: 1.64 m., cross-sectional area 2.11 m.$^2$.
Height: 1.3 m.
Number of vessels: 4

Timer cycle:

Resin feed from a hopper to a liquid-passing vessel is 125 l./vessel for 15 seconds accordingly, time required for the resin feed (liquid-discharging time)

$$(169/125) \times 15 = 20 \text{ sec.}$$

Time for liquid-passage 19 min. 40 sec.
Time for liquid-discharge 20 sec.

Liquid-passage amount:

75 m.$^3$/hr. per vessel, as an average
76.3 m.$^3$/hr. per vessel, at moment

Liquid-passage velocity:

35.6 m./hr., on average
36.2 m./hr., at moment

The dimensions of each of the vessels should be suitably determined depending upon the specific conditions, e.g. regeneration efficiency, water-washing efficiency, exchange equilibrium, exchange velocity, etc. This means that the dimension of each vessel shall, in practice, be calculated from the regeneration-leakage curve or liquid passage-leakage curve both which are influenced by liquid-passing velocity or exchange velocity, or based on the relation between regeneration-exchange equilibrium curve and operation curve.

As shown in the above example, the amount of the resin from the hopper can be easily controlled by selecting the proper liquid-discharging time.

When the resin is transferred into the next vessel by head or liquid pressure, a minimum effective pressure will be determined depending on the distance or pressure difference between these adjacent vessels, the surfacial state of the resin, the diameter of pipe lines used, etc. Usually, when the resin is transferred by head, it will move at a flow rate of 1 m./sec. by the heat of 1 m. $H_2O$. The resin, when metered by a liquid pressure of 1–2 kg./cm.$^2$, can be properly adjusted by means of a hand cock equipped at the resin-discharging port at the bottom of the vessel.

It will be apparent that an ion exchange apparatus of the movable bed type is radically different from a catalytic reaction apparatus of the fluid bed type. For information only, the difference between these apparatus is as follows: While the latter type apparatus has limited upwardly flowing velocity of liquid below the terminal velocity of resin, the present type apparatus permits to employ the upwardly flowing velocity independently of the terminal velocity of the resin and accordingly it can treat greater liquid volumes or 40–70 m.$^3$/m.$^2$ hr., as compared with that of the latter. The present type of apparatus, because of less disturbance in interaction streams, requires an approximately theoretical amount of regenerating agent whereas the fluid bed type of apparatus frequently requires a very large amount of regenerating agent. As a third characteristic, the present apparatus does not permit to dissipate the resin while the fluid bed type apparatus occasionally does, and the present apparatus requires a smaller floor space than the latter type apparatus does for a determined liquid volume.

What is claimed is:

1. In a continuous ion exchanging apparatus of the movable bed type which apparatus is provided with an ion exchange vessel, a regenerating vessel for regenerating resin which has undergone ion exchange and a liquid washing vessel for washing regenerated resin, and wherein each vessel includes a bottom of conical shape, the improvement comprising resin discharging means at the bottom of each vessel and adapted to feed discharged resin to another of said vessels; means for passing a liquid through said vessels with the resin therein and at a level such that said resin is divided into two layers under the action of the pressure of said liquid, one of which layers is discharged from the corresponding vessel through the resin discharging means thereof and simultaneously with the passing of liquid through said corresponding vessel, said ion exchange vessel being provided with an outlet for liquid which has undergone ion exchange in said vessel, said means for passing liquid defining an inlet in the corresponding vessel which is centrally positioned therein, said two layers of resin being formed on opposite sides of said inlet by the liquid passing therethrough, liquid discharge means in communication with each said vessel at a level between the layers of resin therein for discharging liquid from each said vessel after stoppage of passing of liquid therethrough, and storage means at the top of each vessel for receiving resin from the discharge means of another vessel and for introducing resin into the vessel associated therewith.

2. Apparatus as claimed in claim 1 comprising valve means between each vessel and the corresponding storage means, said valve means being sensitive to pressure to controllably supply resin to the corresponding vessel with the liquid discharge means thereof operative.

3. Apparatus as claimed in claim 1 wherein said storage means is a hopper.

4. A method for continuously transferring ion exchange resin comprising upwardly passing a feed-solution through a vessel which contains said ion exchange resin by introducing the solution into the resin at a level to divide the resin into a lower resin layer which is constituted of exhausted resin from a preceding cycle and an upper fresh resin layer positioned above said exhausted resin layer, the solution passing upwardly through the upper layer of resin to therein effect ion exchange therewith, continuously discharging resin from said lower exhausted resin layer by the pressure exerted by the feed solution to form an intermediate zone filled with feed-solution between said two resin layers, the discharged resin from the lower layer being accompanied with solution positioned below said level at which solution is introduced and simultaneous with the passage of feed-solution through the upper layer which effects said ion exchange, discharging the solution between said layers simultaneously with the stoppage of the introduction of feed-solution into the vessel after a predetermined period of time to cause a reduction of pressure within the vessel and concurrent dropping of the upper resin layer by gravity while fresh resin is supplied simultaneously with said discharging of the solution to fill the space resulting above the upper resin layer as a consequence of dropping thereof, the supply of fresh resin into the vessel being terminated upon the subsequent introduction of solution to be treated into the vessel for upward passage therethrough.

References Cited in the file of this patent

UNITED STATES PATENTS

| | | |
|---|---|---|
| 2,973,319 | Porter | Feb. 28, 1961 |
| 3,064,816 | Griswold | Nov. 20, 1962 |

OTHER REFERENCES

Chemical Week, vol. 78, April-June 1956, pp. 74–76 relied on.